(12) United States Patent
Goebel

(10) Patent No.: US 7,438,734 B2
(45) Date of Patent: Oct. 21, 2008

(54) DIRECT WATER VAPORIZATION FOR FUEL PROCESSOR STARTUP AND TRANSIENTS

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/335,002

(22) Filed: Jan. 19, 2006

(65) Prior Publication Data

US 2006/0112640 A1    Jun. 1, 2006

Related U.S. Application Data

(62) Division of application No. 10/077,471, filed on Feb. 15, 2002, now Pat. No. 7,008,707.

(51) Int. Cl.
*C01B 3/24* (2006.01)
*C01B 3/26* (2006.01)
*C01B 3/36* (2006.01)
*C01B 3/38* (2006.01)

(52) U.S. Cl. ................... 48/198.1; 48/197 R

(58) Field of Classification Search ............ None
See application file for complete search history.

(56) References Cited

U.S. PATENT DOCUMENTS

| | | | |
|---|---|---|---|
| 3,955,941 A * | 5/1976 | Houseman et al. | 48/95 |
| 4,001,041 A | 1/1977 | Menard | 429/17 |
| 4,080,487 A | 3/1978 | Reiser | 429/16 |
| 4,946,667 A | 8/1990 | Beshty | |
| 5,110,559 A | 5/1992 | Kondo et al. | |
| 5,484,577 A | 1/1996 | Buswell et al. | |
| 5,945,229 A | 8/1999 | Meltser | 429/13 |
| 6,485,853 B1 * | 11/2002 | Pettit et al. | 429/17 |
| 6,641,625 B1 | 11/2003 | Clawson et al. | 48/127.9 |
| 6,783,877 B2 | 8/2004 | Shimazu et al. | 429/17 |
| 6,866,091 B2 | 3/2005 | Autenrieth | |
| 6,926,748 B2 | 8/2005 | Goebel et al. | 48/127.9 |
| 6,936,082 B2 | 8/2005 | Primdahl | |
| 2001/0009653 A1 | 7/2001 | Clawson et al. | |
| 2001/0018139 A1 | 8/2001 | Aoyama et al. | 429/19 |
| 2001/0038934 A1 | 11/2001 | Berlowitz et al. | |

* cited by examiner

*Primary Examiner*—Glenn Caldarola
*Assistant Examiner*—Randy Boyer

(57) ABSTRACT

A fuel cell system including a fuel reforming processor having a catalyst therein constructed and arranged to produce a reformate stream including hydrogen and carbon monoxide, a water gas shift reactor downstream of the fuel reforming processor and wherein the water gas shift reactor includes a catalyst therein constructed and arranged to reduce the amount of carbon monoxide in the reformate stream, a preferential oxidation reactor downstream of the water gas shift reactor and wherein the preferential oxidation reactor includes a catalyst therein constructed and arranged to preferentially oxidize carbon monoxide into carbon dioxide and to produce a hydrogen-rich stream, and a fuel cell stack downstream of the preferential oxidation reactor constructed and arranged to produce electricity from the hydrogen-rich stream, a first direct water vaporizing combustor constructed and arranged to combust fuel producing a high-temperature fuel combustion byproducts exhaust and to produce steam from water sprayed into the combustion byproduct exhaust and wherein the first direct water vaporizing combustor is plumbed to the fuel reforming reactor to charge steam therein, and a second direct water vaporizing combustor constructed and arranged to combust fuel to produce a high-temperature fuel combustion byproduct exhaust and to produce steam from water sprayed into the fuel combustion byproduct exhaust and wherein the second direct water vaporizing combustor is plumbed to the water gas shift reactor to charge steam therein.

7 Claims, 3 Drawing Sheets

DIRECT WATER VAPORIZATION FOR FUEL PROCESSOR STARTUP AND TRANSIENTS

CROSS REFERENCE TO RELATED APPLICATIONS

This is a Division Application of U.S. application Ser. No. 10/077,471 filed Feb. 15, 2002 now U.S. Pat. No. 7,008,707.

TECHNICAL FIELD

This invention relates to a fuel processing system, and more particularly to a fuel processing system with direct water vaporization for fuel processor startup and transients in a fuel cell system.

BACKGROUND OF THE INVENTION

Many fuel cells use hydrogen ($H_2$) as a fuel and oxygen (typically in the form of air) as an oxidant. The hydrogen used in the fuel cell can be produced from the reformation of fuels that include hydrogen (for example, methanol or gasoline). The reforming of fuels that include hydrogen may be accomplished using a variety of techniques including: (1) steam reforming in which the fuel in gaseous form reacts with steam; (2) partial oxidation in which the fuel reacts with oxygen or air in proportions less than that needed for complete oxidation; or (3) autothermal reforming in which the fuel partially reacts with steam and partially reacts with oxygen (or air) in a combination steam reforming and partial oxidation type reactor. Steam reforming is more efficient in terms of the yield of hydrogen than partial oxidation. Steam reforming is endothermic while partial oxidation as exothermic. Autothermal reforming falls somewhere in between steam reforming and partial oxidation both in terms of hydrogen yield and the heat addition/removal required.

The selection of a particular reforming process depends upon the particular operation and factors which include the hydrogen yield required, equipment costs and complexity, and the overall process heat requirements. Regardless of the type of fuel reforming reactor utilized, the reformate exiting the reactor typically includes undesirably high concentrations of carbon monoxide which must be removed to prevent poisoning of the catalyst on the fuel cell's anode. The hydrogen-rich reformate/effluent exiting the fuel reforming reactor typically includes carbon monoxide, in about 3-10 mole percent, that must be reduced to very low concentrations, preferably less than 20 ppm, to avoid poisoning the fuel cell anode catalyst.

It is known that the carbon monoxide level of the reformate/effluent exiting a fuel processing reactor can be reduced utilizing a "water gas shift reaction" (WGS) utilizing the excess steam present in the reformate exiting the fuel reforming reactor or wherein water in the form of steam is added to the reformate/effluent exiting the fuel reforming reactor in the presence of a suitable catalyst. This lowers the carbon monoxide content in the reformate according to the following ideal water gas shift reaction:

$$CO + H_2O \rightarrow CO_2 + H_2 (WGS)$$

About 0.5 mole percent or more CO still survives the water gas shift reaction. The effluent exiting the water gas shift reactor includes hydrogen, carbon dioxide, water, carbon monoxide, and nitrogen.

The water gas shift reaction is a not enough to reduce the CO content in the reformate to an acceptable level of about 20-200 ppm or less. Therefore, it is necessary to further remove carbon monoxide from the hydrogen-rich reformate stream exiting the water gas shift reactor prior to supplying the hydrogen-rich stream to the fuel cell. It is also known to further reduce the CO of the hydrogen-rich reformate exiting the water gas shift rector using a preferential oxidation (PrOx) reaction conducted in a reactor with a suitable catalyst and at a temperature that promotes the preferential oxidation of the CO with the $O_2$ (air) in the presence of the $H_2$ but without consuming or oxidizing substantial amounts of $H_2$ or without triggering a "reverse water gas shift" (RWGS) reaction. The PrOx and RWGS reactions are as follows:

$$CO + \tfrac{1}{2}O_2 \rightarrow CO_2 (PrOx)$$

$$CO_2 + H_2 \rightarrow H_2O + CO (RWGS).$$

Preferably, the oxygen provided for the PrOx reaction will be about two times the stoichiometric amount required to react the CO in the reformate. If the amount of oxygen exceeds about two times the stoichiometric amount needed, excessive consumption of hydrogen results. On the other hand, if the amount of oxygen is substantially less than about two times the stoichiometric amount needed, insufficient CO oxidation may occur and there is a greater potential for the reverse water gas shift (RWGS) reaction to occur. Therefore, it is typical for the process to be conducted at about four or more times the stoichiometric amount of oxygen that is theoretically required to react with the CO.

PrOx reactors may be either (1) adiabatic wherein the temperature of the reactor is allowed to rise during oxidation of the CO, or (2) isothermal wherein the temperature of the reactors maintain substantially constant during the oxidation of the CO. The adiabatic PrOx process is sometimes affected via a number of sequential stages, which progressively reduces the amount of CO in stages and requires careful temperature control so that the temperature rise is not so great that the reverse water gas shift reaction occurs thereby undesirably producing more CO.

The fuel reforming process of gasoline or other hydrogen containing fuels typically occurs at high temperatures of about 600-800° C. or above. The one notable exception is methanol which can be reformed at temperatures of about 400° C. The water gas shift reaction is typically carried out at a temperature of about 250-450° C. The PrOx reaction typically occurs at about 100-200° C. Therefore, it is necessary for the fuel reforming reactor, the water gas shift (WGS) reactor, and the PrOx reactor to be heated to temperature sufficient for the system to operate properly. However, during startup, conventional fuel processing requires the system components to be heated in stages. This approach leads to an undesirable lag time for bringing the system online. For example, in conventional fuel cell systems it is typical to use boilers, tube and shell type exchangers, or compact bar and plate type exchangers to produce steam from water. These boilers or exchangers are massive and require a substantial amount of heat input to heat up the equipment components before heat can be transferred to the water to create steam. A substantial amount of lag time is thus associated with the use of these types of steam generating equipment. Furthermore, these heavy boilers or exchangers are a disadvantage in mobile applications such as vehicles which are powered at least in part by a fuel cell system. Because there is no direct contact between the combustion source in the boiler or the fluid in the tube and shell heat exchanger, these devices produce pure steam.

Alternatively, external electric heat sources may be employed to bring the components to proper operating temperatures. This approach requires an external electrical source such as a battery, which is heavy, and draws electricity from the system that is designed to generate electricity through the fuel cell. Furthermore, in conventional fuel processing and fuel cell systems, substantial increases on the fuel cell electrical load demand requires rapid delivery of substantial amounts of hydrogen to the fuel cell to accommodate the increase in electrical demand. A substantial lag time has typically occurred in conventional fuel cell systems attempting to respond to such transient conditions.

Therefore, it is desirable to provide a fuel processing system in a fuel cell system that is capable of rapidly producing substantial amounts of heat and hydrogen to quickly achieve high operating temperatures necessary for startup, and is capable of producing substantial amounts of heat and hydrogen necessary to respond to dramatic increases in electrical load demand on the fuel cell during transient conditions. The present invention provides alternatives to and advantages over the prior art.

SUMMARY OF THE INVENTION

One embodiment of the invention includes the direct vaporization of water by combustor exhaust to create steam and charging the steam into a fuel processor for rapid startup.

Another embodiment of the invention includes the direct vaporization of water by combustor exhaust to create steam, and charging the steam into a fuel processor for rapid up-transients.

Another embodiment of the invention includes the use of cool, lean exhaust to increase mass flow for staged rich combustion within fuel processor reactors.

Another embodiment of the invention includes the use of cool, lean exhaust via water spray or heat exchange which therefore has reduced oxygen content and charging this exhaust into an autothermal reactor and therefore allows fuel rich reaction in the autothermal reactor at oxygen to carbon ratios greater than one as required to avoid carbon formation or fuel slip without creating excessively high temperatures that would otherwise occur without dilution at oxygen to carbon ratios greater than one.

Another embodiment of the invention includes the use of steam condensation to rapidly heat reactors and heat exchangers to the condensation temperature to allow steam to pass through such reactors and heat exchangers until steam can be produced using conventional steam generation components within the fuel cell system.

Another embodiment of the invention includes the use of direct vaporization of water by combustor exhaust to produce steam and charging the steam into a water gas shift reactor to support water gas shift reactions.

Another embodiment of the invention includes the use of direct vaporization of water by combustor exhaust to produce steam, and charging the steam into an autothermal reactor to support steam reforming and high-temperature shift reactions.

Another embodiment of the invention includes the use of direct vaporization of water by fuel rich combustion exhaust to produce steam, $H_2$ and CO and charging the same into an autothermal reactor and the use of direct vaporization of water by combustor exhaust to produce steam with excess $O_2$ and charging into a water gas shift reactor where the overall fuel to air ratio upstream of a preferential oxidation reactor is slightly rich of stoichiometric conditions as this will produce a gas composition with sufficient $H_2$ levels and low CO levels without requiring water gas shift activity which is desirable to ensure preferential oxidation catalyst light-off at ambient temperatures without CO blanketing of the catalyst.

Another embodiment of the invention includes the direct vaporization of water by combustor exhaust to produce a combustor effluent stream including combustion byproducts and steam, and charging of the combustor effluent into a preferential oxidation reactor having a catalyst therein so that the catalyst is heated to its light off temperature.

These and other objects, features and advantages of the present invention will become apparent from the following brief description of the drawings, detailed description of the preferred embodiments, and appended claims and drawings.

DESCRIPTION OF THE PREFERRED EMBODIMENT

Figure 1:
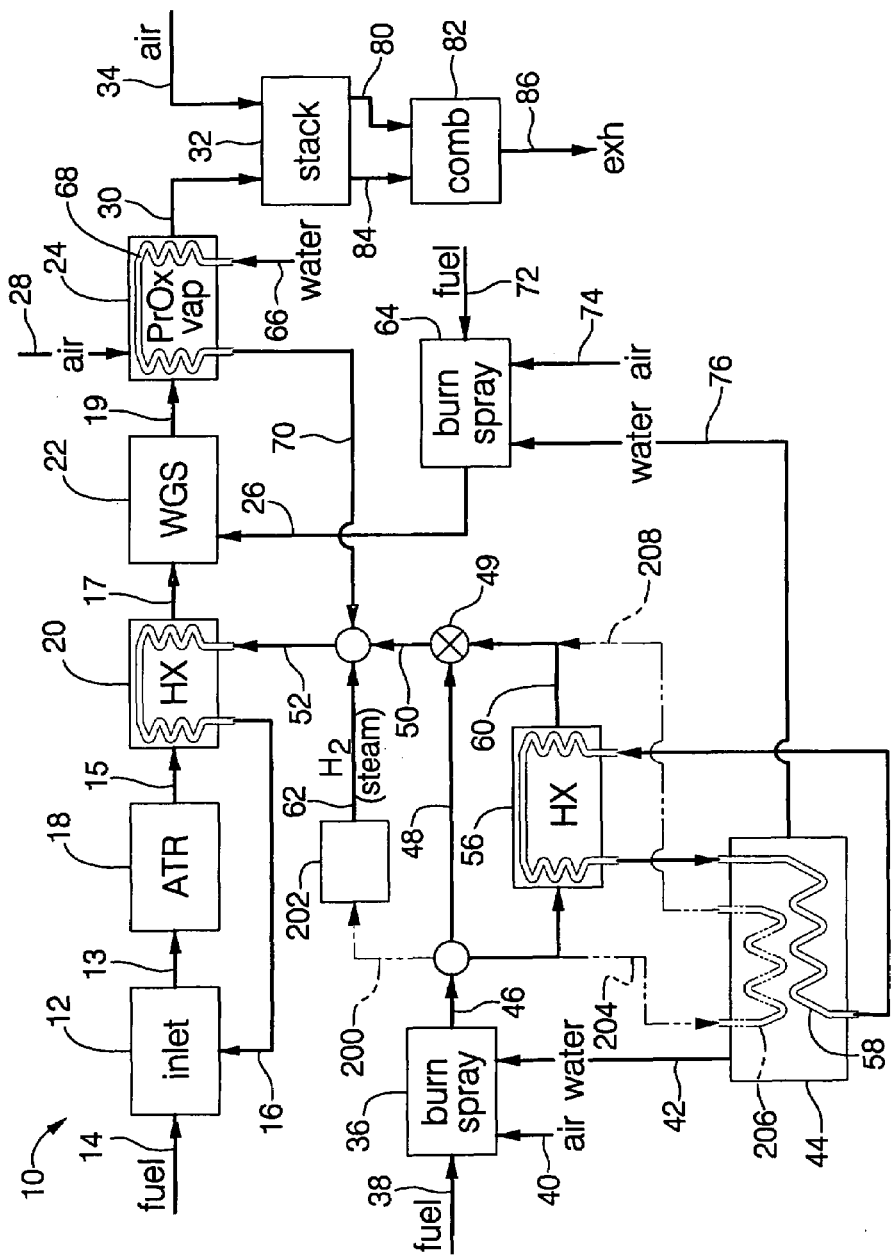
FIG. 1 is a schematic illustration of a fuel cell system according to the present invention.

FIG. 1 illustrates a fuel cell system 10 according to the present invention. In this preferred embodiment, the fuel cell system 10 includes an inlet portion 12. A reformable fuel which may include compounds or molecules including hydrogen, including, but not limited to, gasoline, methanol, and/or methane is charged into the inlet via line or plumbing 14. During normal operation of the fuel cell stack 32 (that is, other than during startup or transient conditions as described below), an oxidant such as oxygen in the form of air and/or steam may be charged into the inlet 12 via line or plumbing 16. The reformable fuel and oxidant and/or steam are mixed in the inlet 12 and then charged (via line or plumbing 13) into a fuel reforming reactor 18 downstream of the inlet 12. The fuel reforming reactor 18 may include a suitable catalyst to reform the fuel and to produce a hydrogen-rich stream using a variety of techniques as described above. The fuel reforming reactor 18 may be a steam reforming reactor having a suitable catalyst for reacting the fuel with steam. The fuel reforming reactor 18 may also be a partial oxidation reactor including a suitable catalyst for promoting the reaction of the fuel with oxygen or air in proportions less than that needed for complete oxidation. The fuel reforming reactor 18 may also be an autothermal reforming reactor including a suitable catalyst for promoting the partial reaction of the fuel with steam and the partial reaction of the fuel with oxygen or air in a combination steam reforming and partial oxidation type reactor. Suitable catalysts for these fuel reforming reactors are known to those skilled in the art, particularly those in the catalyst art, and typically are precious metal based catalysts usually including platinum. A suitable autothermal reforming reactor may include precious metal based catalysts including platinum, rhodium, Ru and Pd, and may include additional promoters to promote the partial oxidation and steam reforming reactions in the autothermal reactor. The catalyst may be coated on or impregnated in beads or a substrate which may be a ceramic foam, ceramic or metal monolith, or plate type substrates. For an autothermal reforming reactor, the catalyst is uniformly coated on the substrate; however, the front of the autothermal reactor predominantly promotes a partial oxidation reaction because the chemical kinetics of the partial oxidation reaction are faster than the steam reforming reaction. Thus, most of the oxygen is consumed in the front of the autothermal reactor and only steam is available in the rear of the reactor for hydrocarbon reforming. Therefore, the rear of the autothermal reactor predominantly promotes the steam reforming reaction.

As described earlier, the effluent exiting via line 15 from the fuel reforming reactor 18 may have undesirably high concentrations of CO. Therefore, gas purification components may be located downstream of the fuel reforming reactor 18. The hydrogen-rich stream exiting the fuel reforming reactor 18 may optionally be charged via line or plumbing 15 to a heat exchanger 20 to decrease the temperature of the hydrogen-rich stream and heat the air and/or steam charged into the inlet 12 via line or plumbing 16 for normal operation. The hydrogen-rich stream exiting the heat exchanger 20 may optionally be charged via line or plumbing 17 to the water gas shift reactor 22 having a suitable catalyst to react the hydrogen-rich stream with the steam charged into the water gas shift reactor 22 via line or plumbing 26 and/or with excess steam in the effluent from the fuel reforming reactor 18. Suitable catalysts for the water gas shift reactor include precious metal-based catalysts such as Pt, and non-precious metal-based catalysts such as CuZn and/or FeCr. In either case, additional promoters may be added to enhance the water gas shift reaction. Again, the catalyst is coated on or impregnated in beads or a substrate as described above. As described above, the steam reacts with the CO to produce carbon dioxide and $H_2$, in the water gas shift reactor.

The hydrogen-rich gas stream exiting the water gas shift reactor 22 may still have too high of a concentration of CO. Therefore, the hydrogen-rich gas stream exiting the water gas shift reactor 22 may be charged via line or plumbing 19 to a preferential oxidation reactor 24 having a suitable catalyst therein for promoting a preferential oxidation of carbon monoxide to carbon dioxide. Suitable preferential oxidation reactor catalysts include precious metals such as gold and/or platinum. Again, additional promoters may be added to further enhance the preferential oxidation reaction. The catalyst may also be carried in or on beads or substrates as described above. Additional oxidant in the form of air is charged via line or plumbing 28 to the preferential oxidation reactor 24. As described above, the additional oxygen reacts with the CO to produce $CO_2$. The hydrogen-rich stream exiting the preferential oxidation reactor 24 includes an acceptable amount of CO which typically is 20-200 ppm, and preferably less than 20 ppm. The hydrogen-rich stream with low CO is delivered via line or plumbing 30 to a fuel cell, and preferably a fuel cell stack 32 wherein the hydrogen is reacted with oxygen (providing via line or plumbing 34) to produce electricity in a manner known to those skilled in the art.

The cathode exhaust from the fuel cell stack 32 may be charged via line 80 to a combustion device such as a catalytic combustor 82. Likewise, the anode exhaust from the fuel cell stack 32 may be charged via line 84 to the same combustor device 82 wherein the anode and the cathode exhaust are combusted and the exhaust is charged to the atmosphere via line 86 or used elsewhere in the fuel cell system 10.

For mobile applications, such as for use in automobiles, trucks and the like, to facilitate rapid startup (when the system has not been running, components are cold, and the fuel cell is not producing electricity), a source of substantial heat and steam is needed in a very short period of time. To facilitate rapid startup, the present invention provides a first direct water vaporizing combustor 36 into which a combustible fuel is charged via line or plumbing 38 and into which in oxygen in the form of air is charged via line or plumbing 40. The first direct water vaporizing combustor 36 includes an ignition source such as a spark source (sparkplug) as will be described hereafter for igniting the fuel in the presence of the oxygen (in the air) to produce a high temperature exhaust stream. Water is also charged into the first direct vaporizing combustor 36 via line or plumbing 42. The water in line 42 may be provided from a water source such as a water tank 44. The water is sprayed into the high temperature exhaust (produced by combusting the fuel) to immediately vaporize the water and produce a stream including steam and the fuel combustion byproducts. The steam and the fuel combustion byproducts produced by the first direct water vaporizing combustor 36 may be delivered via lines 46, 48, through a bypass valve 49, through lines 50 and 52 to the heat exchanger 20 that is used to heat the effluent from the fuel reforming reactor 18 for startup. From the heat exchanger 20, the stream including the steam and fuel combustion byproducts is charged into the inlet 12 via line or plumbing 16, and onward into the fuel reforming reactor 18.

If the water source used to spray water into the first direct water vaporizing combustor 36 is frozen, the bypass valve 49 is controlled to direct the hot exhaust from the first direct water vaporizing combustor 36 via lines 46 and 54 to a second heat exchanger 56. The second heat exchanger 56 warms a heat exchange fluid that may be delivered in to a third heat exchanger 58 in the water tank 44 to thaw the frozen water. Alternatively, the steam from the first direct water vaporizing combustor 36 may be charged via line 204 into a steam heat exchanger 206 in the water tank and then discharged from the heat exchanger 206 via line 208. The exhaust from the first direct water vaporizing combustor 36 continues on via line 60, bypass valve 49, lines 50 and 52, through the heat exchanger 20 and charged to the inlet 12 via line 16. Light off hydrogen may be provided via line 62 and charged into line 52 and ultimately into the fuel reforming reactor 18 via line 16. The hydrogen may be provided by a pressurized hydrogen storage tank, or alternatively, the hydrogen may be stored in a hydrogen storage unit 202. The hydrogen storage unit 202 may include a hydrogen storage material wherein hydrogen is adsorbed, absorbed or bonded to the hydrogen storage material. The hydrogen may be released from the hydrogen storage unit 202 upon application of heat from the steam or the charging of the steam directly into or onto the hydrogen storage material. Accordingly, alternative embodiment includes a line 200 from the first direct water vaporizing combustor 36 to the hydrogen storage unit 202 to use steam to heat the hydrogen storage material using a heat exchanger (not shown) or the steam may be charged directly onto the hydrogen storage material. If a heat exchanger is used, the steam and combustion byproducts would exit the hydrogen storage unit 202 via a separate line (not shown) and then connect to line 52. In that case, only $H_2$ would be carried in line 62. If the steam and combustion byproducts from the first direct water vaporizing combustor 36 are charged directly into or onto the hydrogen storage material, line 62 would include $H_2$, steam and combustion byproducts.

Water may be charged via line 66 to a third heat exchanger 68 in the preferential oxidation reactor 24 to remove heat and produce steam which may be charged via line 70 into the steam line 52 that carries steam created by the first direct water vaporization combustor 36.

A second direct water vaporizing combustor 64 may be provided and charged with a combustible fuel via line 72. The fuel is combusted in the presence of oxygen provided by air charged into the second direct water vaporizing combustor 64 via line 74. Water is sprayed into the second direct water vaporization combustor 64 via line 76 to produce steam. The exhaust stream including steam and fuel combustion byproducts produced by the second direct water vaporization combustor 64 is charged into the water gas shift reactor 22 via line

26. The stream including steam (26) and fuel combustion byproducts that is charged into the water gas shift reactor 22 is required to reduce the CO to levels ranging from about 1-2 mole percent which the PrOx reactor 24 can handle for final CO cleanup before delivery to the fuel cell stack 32.

The sequential steps for starting the fuel cell system 10 illustrated in FIG. 1 from a cold start are as follows: (1) flowing air via line 40 to the first direct water vaporizing combustor 36 and onward to fuel reforming reactor 18, and flowing air via line 74 to the second direct water vaporizing combustor 64; (2) delivering fuel via line 38 to the first direct water vaporizing combustor 36, and delivering fuel via line 72 to the second direct water vaporizing combustor 64 and energizing sparkplugs in each combustor 36, 64 to ignite the fuel and oxygen therein; (3) delivering water via line 42 to the first direct water vaporizing combustor 36 to produce steam, and delivering water via line 76 to the second direct water vaporizing combustor 64 to produce steam, so that the steam from the first direct water vaporizing combustor 36 is charged into the fuel reforming reactor 18 and steam from the second direct water vaporizing combustor 64 is charged into the water gas shift reactor 22; (4) delivering light off hydrogen (stored hydrogen or reformate) via line 62 to the fuel processing reactor 18; (5) delivering air via line 28 to the PrOx reactor 24 and delivering air via line 34 to the fuel cell stack 32; (6) determining when the catalysts in the fuel reforming reactor 18, water gas shift reactor 22, and preferential oxidation reactor 24 are above their respective light off temperatures or heated to a temperature to provide the desired activity, and thereafter turning off the light off hydrogen (line 62) and delivering fuel to the fuel processing reactor 18 via line 14; (7) drawing current from the fuel cell stack 32 when available; and (8) when steam (from first direct water vaporizing combustor 36 through fuel reforming reactor 18 and heat exchanger 20) is available to the water gas shift reactor 22, the fuel 72 and water 76 to second water vaporizing combustor 64 may be shut off (and the air 74 may be continued as needed to maintain the desired reaction temperature in the water gas shift reactor 22), and when normal operation steam (from the preferential oxidation reactor/vaporizer 24 as shown) is available to the fuel reforming reactor 18, the fuel 38 and water 40 to first water vaporizing combustor 36 may be shut off (and the air 40 would continue to provide the oxygen for a partial oxidation or autothermal reforming type fuel reforming reactor).

With regard to the above sequential steps for starting out the fuel cell system illustrated in FIG. 1, if hydrogen for catalyst light off is not available, stored reformate could also be used. If hydrogen or reformate are not available for catalyst light off, EHC heating could be used for small portions of the catalyst to allow light off. The EHC heating would preferably be conducted prior to the first step outlined above to minimize the electric energy for heating. For systems without hydrogen, stored reformate or EHC heating, the configuration shown in FIG. 2 would be used.

Figure 2:
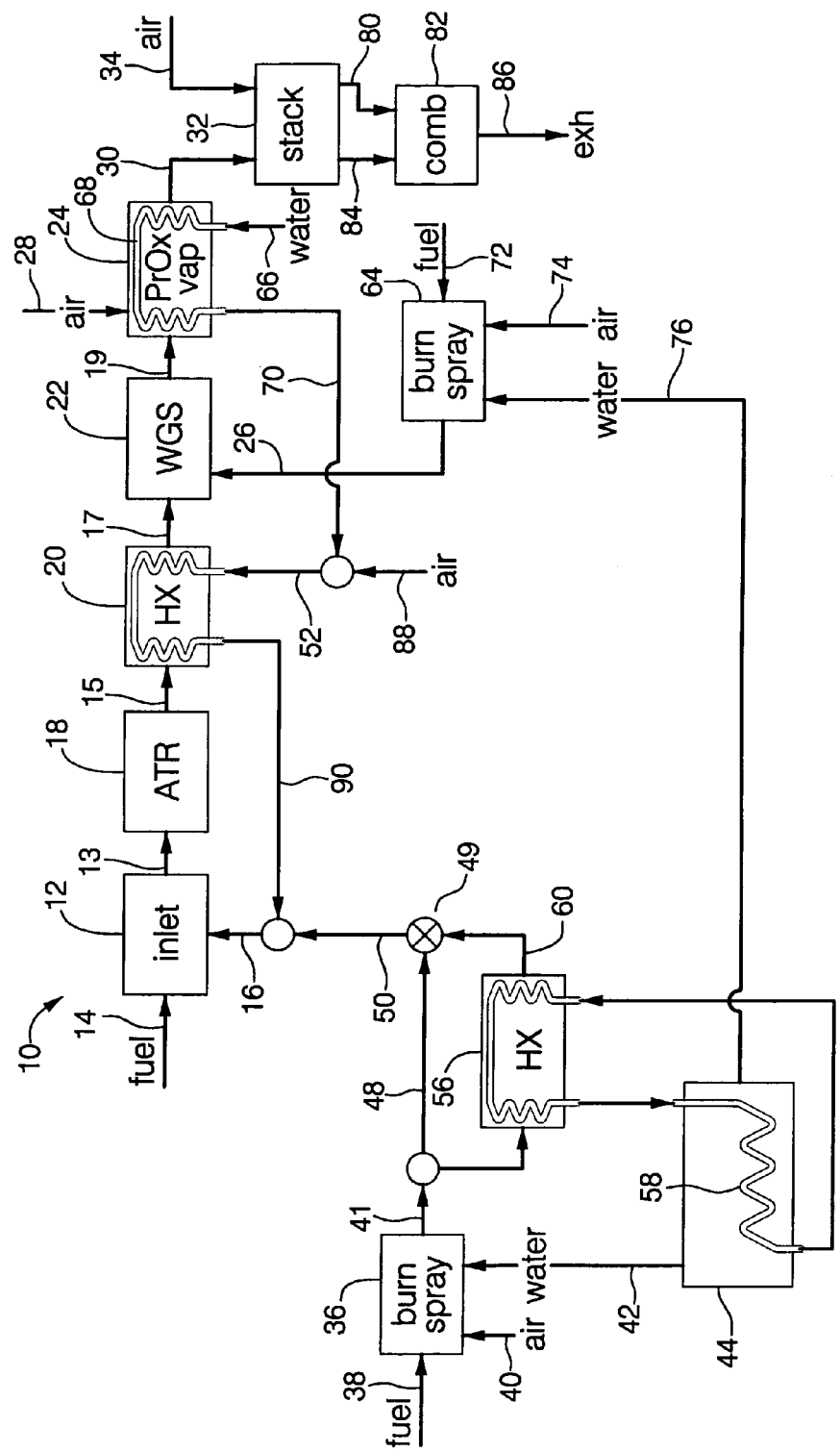
FIG. 2 is a schematic illustration of the fuel cell system according to the present invention.

FIG. 2 illustrates an alternative embodiment of the fuel cell system 10 according to the present invention which is similar to the fuel cell system illustrated in FIG. 1 but with a few variations. The embodiment illustrated in FIG. 2 is particularly well suited for systems where startup hydrogen (or stored reformate) is not available. In this alternative embodiment (FIG. 2), the steam generated by the first direct water vaporizing combustor 36 travels through bypass valve 49, through lines 50 and 16 and is charged directly into the fuel reforming reactor 18 via inlet 12. This arrangement achieves direct and rapid heating of the fuel reforming reactor 18 catalyst to achieve light off. It is desirable to quickly heat each of the catalytic reactors so that reformate production can begin as soon as possible. To achieve PrOx catalyst light off, low CO reformate is required because high levels of CO can blanket the PrOx catalyst and suppress reactions. Accordingly, the first direct water vaporizing combustor 36 is operated slightly fuel rich, thereby producing exhaust gas that contains hydrogen and low levels of CO. Operation at high temperatures near stoichiometric conditions is possible with the direct water vaporizing combustor 36 to reduce temperatures before any downstream components. Furthermore, because the second direct water vaporizing combustor 64 provides steam directly to the water gas shift reactor 22, CO levels can be reduced further in the water gas shift reactor 22 before the effluent enters the PrOx reactor 24.

The sequential steps for starting out the fuel cell system 10 illustrated in FIG. 2 would be the same as that for FIG. 1 except that no hydrogen would be utilized (added) in the first direct water vaporizing combustor 36 exhaust stream. In other words, the sequential steps in starting up the fuel cell system 10 illustrated in FIG. 2 would be as follows: (1) flowing air via line 40 to the first direct water vaporizing combustor 36 and onward to fuel reforming reactor 18, and flowing air via line 74 to the second direct water vaporizing combustor 64; (2) delivering fuel via line 38 to the first direct water vaporizing combustor 36 to run the combustor in a slightly fuel rich condition, and delivering fuel via line 72 to the second direct water vaporizing combustor 64 and energizing sparkplugs in each combustor 36, 64 to ignite fuel and air therein; (3) delivering water via line 42 to the first direct water vaporizing combustor 36, and delivering water via line 76 to the second direct water vaporizing combustor 64 to produce steam from each combustor 36, 64 and so that steam is charged from the first direct water vaporizing combustor 36 into the fuel reforming reactor 18 and steam from the second direct vaporizing combustor 64 is charged into the water gas shift reactor 22; (4) delivering air via line 28 to the PrOx reactor 24 and delivering air via line 34 to the fuel cell stack 32; (5) determining when the catalyst are above their respective light off temperatures or heated to a temperature to provide the desired activity, and thereafter delivering fuel to the fuel processing reactor 18 via line 14 and reduce fuel 38 to first direct water vaporizing combustor 36 to operate in lean condition (the excess air provides oxygen to fuel reforming reactor 18) and continue the water 42 to provide steam; and (6) drawing current from the fuel cell stack 32 when available; and (7) when steam (from first direct water vaporizing combustor 36 through fuel reforming reactor 18 and heat exchanger 20) is available to the water gas shift reactor 22, the fuel 72 and water 76 to second water vaporizing combustor 64 may be shut off (and the air 74 may be continued as needed to maintain the desired reaction temperature in the water gas shift reactor 22), and when normal operation steam (from the preferential oxidation reactor/vaporizer 24 as shown) is available to the fuel reforming reactor 18, the fuel 38 and water 40 to first water vaporizing combustor 36 may be shut off (and the air 40 would continue to provide the oxygen for a partial oxidation or autothermal reforming type fuel reforming reactor).

Transition to normal operation of the fuel cell system 10 can begin when steam is being generated by the fuel processors conventional means such as by the PrOx reactor 24 and the heat exchanger 68 so that steam is delivered to the water gas shift reactor 22 by way of the fuel reforming reactor 18. Steam can be delivered by this conventional manner when the upstream reactors and heat exchangers are above the condensation temperature. Steam generated by the first direct water vaporizing combustor 36 would rapidly heat these upstream reactors to the condensation temperature by the heat of vaporization as the steam from the combustor condenses. It would therefore be desirable to drain the condensed water. Otherwise, the water would have to be re-vaporized before the flow into the reactors could achieve normal operating temperatures which would delay a full efficiency operation.

With normal operation, when steam is being generated and delivered, fuel via line 38, water via line 42, fuel via line 72 and water via line 76 would be shut off to the first water vaporizing combustor 36 and to the second water vaporizing combustor 64 respectively. Air flowing via lines 40 and 74 through the first direct water vaporizing combustor 36 and the second direct water vaporizing combustor 64 respectively would be significantly reduced to maintain a desired reaction temperature in the fuel reforming reactor 18 and the water gas shift reactor 22, respectively. Air delivered via line 40 through the first direct water vaporizing combustor 36 would be used to supply air to the fuel reforming reactor 18 for normal operations. The air delivered via line 74 to the second direct water vaporizing combustor 64 can be utilized to maintain a desired temperature at the front of the water gas shift reactor 22 via partial oxidation of the fuel (via line 14) traveling through the gas shift reactor 22 until the water gas shift reactor catalyst is fully heated. For the configuration illustrated in FIG. 2, the air delivered via line 88 to the fuel reforming reactor 18 would be used for normal operation rather than the air delivered via line 40 through the first direct water vaporizing combustor 36. Using air delivered via line 88 allows the air to be heated by the heat exchanger 20 for increased fuel processor efficiency.

The above fuel cell systems illustrated in FIGS. 1 and 2 can be used to directly provide steam needed for rapid fuel processor up transients. Either the first or second direct water vaporizing combustors 36 or 64 can be used to rapidly generate steam. Additional fuel, air and water would be provided to the combustors to generate the required exhaust flow energy to vaporized the spray water. If the first direct water vaporizing combustor 36 is used, excess combustor air would provide oxygen to the fuel reforming reactor 18. If the second direct water vaporizing combustor 64 is used, it would be operated at stoichiometric conditions to prevent additional heating during partial oxidation of the reformate and excess oxygen on the water gas shift reactor catalyst.

Figure 3:
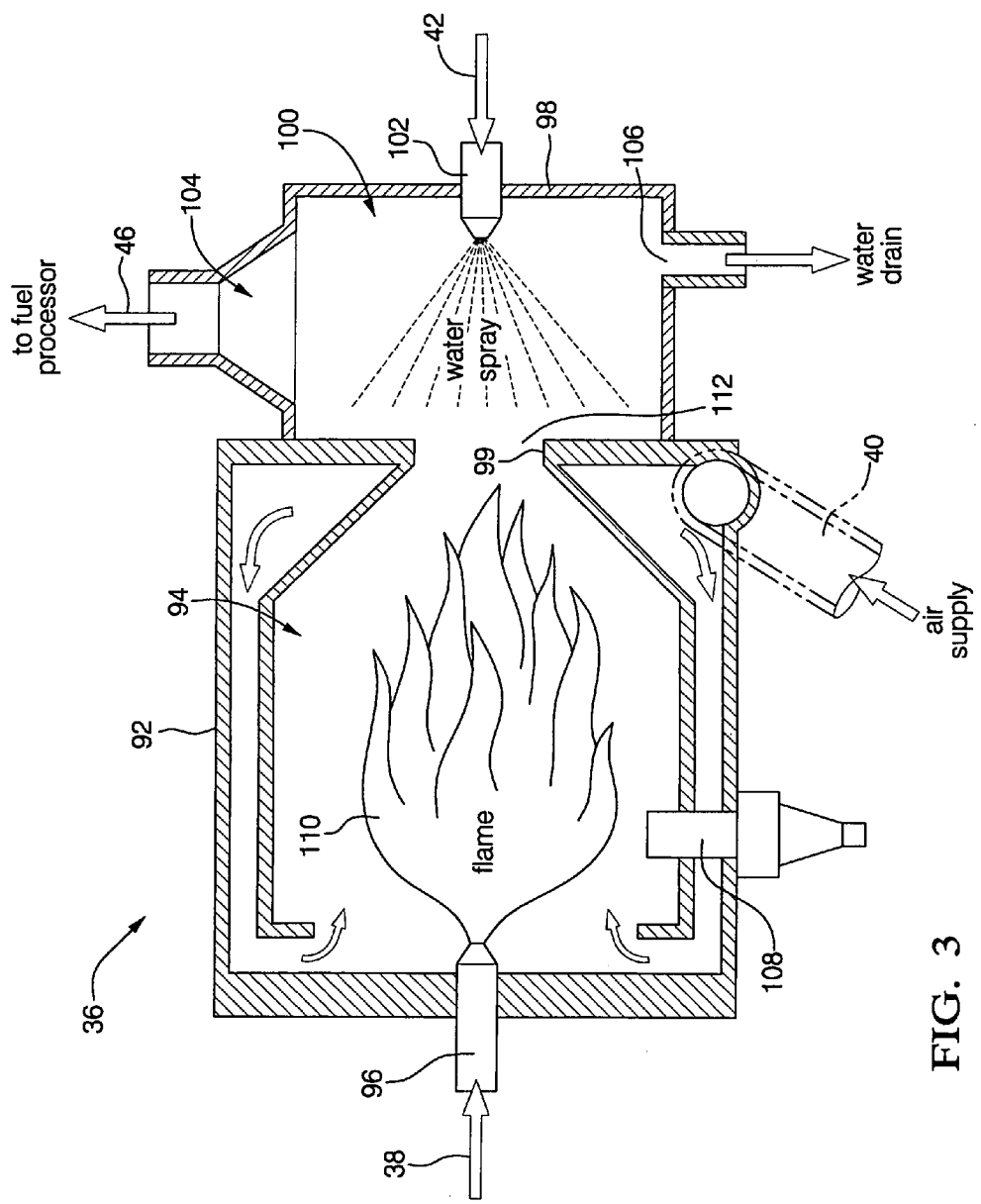
FIG. 3 illustrates a direct water vaporizing combustor according to the present invention.

FIG. 3 is a schematic illustration of a direct water vaporizing combustor 36 (64) useful in the present invention. The direct water vaporizing combustor 36 includes a first housing 92 defining a combustion chamber 94. Fuel may be delivered via line 38 to a fuel injector 96 for spraying or atomizing the fuel into the combustion chamber 94. Air may be delivered via line 40 to the combustion chamber 94. A spark source 108 such as a spark plug is connected to the housing 92 to create a spark in the combustion chamber 94 to ignite the fuel in the presence of the air and to produce a flame 110. A chamber separation wall 99 having an opening 112 therein is provided allowing the high-temperature (high heat content) exhaust from the fuel combustion to enter a second (water spray) chamber 100 defined by a second housing 98 of the combustor 36. Water is delivered via line 42 to a water injector 102 constructed and arranged to spray water into the second (water spray) chamber 100 and allow the sprayed water to be instantaneously vaporized by the high-temperature exhaust from the combustion exhaust. This creates combustor effluent including the steam and the fuel combustion byproducts that exits the second housing through outlet 104 so that the combustor effluent stream may be delivered via line 46 to the fuel reforming reactor 18 (as best seen in FIGS. 1-2). An opening 106 may be provided in the second housing 98 to allow water that has not been vaporized to drain from the second (water spray) chamber 100. The water sprayed into the exhaust of the combustor 36, 64 helps to keep the temperature of the combustor sufficiently low to prevent damage to the combustor or other components in the fuel cell system. Unlike prior art boilers, tube and shell exchangers, or compact bar and plate-type heat exchangers, the combustors of the present invention are lightweight devices of reduced mass capable of instantaneously producing steam, and thus are particularly well suited for mobile applications such as for use in automobiles, trucks and the like that are powered at least in part by fuel cell systems.

The direct water vaporizing combustor 36 illustrated in FIG. 3 is just one embodiment capable of directly vaporizing sprayed water without the use of a heat exchanger to produce steam for use in a fuel reforming reactor or fuel reformate purification equipment according to the present invention. Although combustion in a combustor is utilized to instantaneously vaporized the sprayed water, any other means of instantaneously producing steam by vaporizing sprayed water is contemplated as within the scope of the present invention.

The invention claimed is:

1. A process comprising:
    starting up a fuel cell comprising instantaneously vaporizing sprayed water to produce steam; and
    charging the steam into a fuel reforming reactor having a catalyst therein having a light off temperature substantially above ambient temperature, and wherein the charging of the steam into the fuel reforming reactor is continued until the temperature of the fuel reforming reactor catalyst is above the light off temperature, and only when the catalyst is above the light off temperature then delivering fuel to the fuel reforming reactor.

2. A process as set forth in claim 1 wherein the fuel reforming reactor is an autothermal reforming reactor.

3. A process as set forth in claim 1 wherein the vaporizing of sprayed water comprises burning a combustible fuel in the presence of oxygen to produce a flame and a high-temperature exhaust and spraying water into the high-temperature exhaust to produce the steam.

4. A process comprising:
    starting up a fuel cell comprising instantaneously vaporizing sprayed water to produce steam; and
    charging the steam into a reformate purification component having a catalyst therein having a light off temperature substantially above ambient temperature, to heat the catalyst above the light off temperature and only when the catalyst is above the light off temperature then delivering a reformate stream to the reformate purification component.

5. A process as set forth in claim 4 wherein the reformate purification component includes a water gas shift reactor.

6. A process as set forth in claim 4 wherein the vaporizing of sprayed water comprises injecting fuel and air into a combustor to provide a combustible mixture and igniting the combustible mixture to produce a flame and a combustor high-temperature exhaust, and spraying water into the combustor high-temperature exhaust to vaporize the water and produce the steam.

7. A process comprising instantaneously vaporizing sprayed water to produce steam;
    charging the steam to a fuel reforming reactor having a first catalyst therein having a first light off temperature substantially above ambient temperature, wherein the charging of the steam into the fuel reforming reactor is continued until the temperature of the fuel reforming reactor catalyst is above the first light off temperature;

charging the steam into a water gas shift reactor having a second catalyst therein having a second light off temperature substantially above ambient temperature, and wherein the charging of the steam into the water gas shift reactor is continued until the temperature of the second catalyst is above the second light off temperature, and only when the first catalyst is above the first light off temperature and the second catalyst is above the second light off temperature then delivering fuel to the fuel reforming reactor.

* * * * *